US008139215B2

(12) United States Patent
Ohkubo

(10) Patent No.: US 8,139,215 B2
(45) Date of Patent: Mar. 20, 2012

(54) METHOD FOR MEASURING POLARIZATION CHARACTERISTICS AND MEASUREMENT APPARATUS

(75) Inventor: Akinori Ohkubo, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 12/615,140

(22) Filed: Nov. 9, 2009

(65) Prior Publication Data

US 2010/0118304 A1 May 13, 2010

(30) Foreign Application Priority Data

Nov. 10, 2008 (JP) ................................. 2008-287753

(51) Int. Cl.
*G01J 4/00* (2006.01)
(52) U.S. Cl. ...................................................... 356/364
(58) Field of Classification Search .................. 356/364, 356/369
See application file for complete search history.

(56) References Cited

U.S. PATENT DOCUMENTS

| 5,631,731 A | 5/1997 | Sogard |
| 5,866,935 A | 2/1999 | Sogard |
| 2006/0187451 A1* | 8/2006 | McIntyre et al. ............. 356/364 |
| 2008/0062385 A1 | 3/2008 | Klaassen |

FOREIGN PATENT DOCUMENTS

| JP | 08-22953 A | 1/1996 |
| JP | 2007-281463 A | 10/2007 |

* cited by examiner

*Primary Examiner* — Roy M Punnoose
(74) *Attorney, Agent, or Firm* — Canon U.S.A., Inc. IP Division

(57) ABSTRACT

In a measurement method for measuring polarization characteristics in which an image of a mask pattern is projected onto an image plane, a first and second slit having a width less than or equal to the wavelength of a light source are displaced on the image plane and light passing through the first and second slit is detected to obtain a first and second light intensity distribution with respect to the direction of displacement of the first and second slit. The positions at which the first light intensity distribution takes a maximum and a minimum value are determined. An index value is calculated using the respective light intensities in the second light intensity distribution at positions corresponding to the determined maximum and minimum positions. Polarization characteristics corresponding to the calculated index value are obtained by using information expressing the relationship between the index value and the polarization characteristics.

7 Claims, 17 Drawing Sheets

SINGLE SLIT

MULTIPLE SLITS

METHOD FOR MEASURING POLARIZATION CHARACTERISTICS AND MEASUREMENT APPARATUS

BACKGROUND OF THE INVENTION

1. Field of the Invention

The present invention relates to a method for measuring polarization characteristics and a measurement apparatus.

2. Description of the Related Art

Up to now, image forming performance of an optical system has been evaluated by measuring a wavefront aberration or the polarization characteristics of an optical system and then using those results as the image forming performance of the optical system. However in recent years the increase in the numerical aperture (NA) of optical systems has resulted in a need for increasingly rigorous control of polarization characteristics due to their considerable effect on image formation in the image plane.

As a result, there is a need for a highly accurate measuring technique for polarization characteristics. For example, polarization distribution can be measured using a polarizer such as a crystal on the image plane or the exit of the illumination system.

In addition, a wafer coated with a resist can be used for measuring. More specifically, the wafer is exposed with a mask pattern, which varies sensitively to polarized light.

The evaluation method requires measurement of the resist image formed by developing the resist after exposure using a scanning electron microscope (SEM) or the like. Since the evaluation method requires steps including resist coating, developing, and measuring, considerable time and cost are involved in a single evaluation cycle.

In addition, there is a method for obtaining a polarization ratio by forming an aerial image of the mask pattern in a position corresponding to the image plane without performing an actual exposure operation and then directly measuring a light intensity distribution of the image (hereafter "aerial image measuring method") using a measurement apparatus. An example of this method employs slits for cutting out an aerial image and measuring the light passing through the slits using a light receiving element as discussed, for example, in Japanese Patent Application Laid-Open No. 2007-281463).

A typical slit scan method, for example, uses a slit A540 formed in the light blocking film A51 as illustrated in FIG. 14. FIG. 15 is a schematic diagram illustrating a measuring sensor for a slit scan method on a sectional plane connecting A0 and B0 in FIG. 14.

For example, a line-and-space pattern (hereafter "L/S") is illuminated to form an aerial image 41 having a periodic intensity distribution. The light in a portion of the aerial image 41 passes through the slit A540, which has a width of substantially ½ times the period of the aerial image 41, and after passing through a transparent base plate A52 supporting a light blocking film A51, the light enters the light receiving element A53. The light incident upon the light receiving element A53 undergoes photoelectric conversion and is output as a slit signal S.

A measuring sensor A50 includes the light shielding film A51, the transparent base plate A52, and the light receiving element A53. The measuring sensor A50 is moved by a stage A60 in a stepwise manner by a step corresponding to half of the pitch of the L/S with respect to the x direction. The sensor A50 calculates a contrast by using sensor outputs that are output before and after the step movement respectively. The contrast expresses the level of tone as a ratio or difference between a maximum value and a minimum value of the light intensity and, for example, may be given by ((p−q)/(p+q)) where a maximum value for light intensity is denoted as p and a minimum value as q.

The aerial image 41 varies in response to the ratio of polarization and the contrast gradually decreases as the p polarization component increases which results, for example, in a low-contrast light intensity distribution such as the aerial image 42. In other words, since the contrast fluctuates according to change in the ratio of polarization, the ratio of polarization can be calculated from the measured contrast if the relationship between the ratio of polarization and contrast is clearly identified.

There is a method of using two slits having different slit widths to measure an intensity $I_{TE}$ and $I_{TM}$ on an image plane of transverse electric (TE) polarized light and transverse magnetic (TM) polarized light as discussed, for example, in Japanese Patent Application Laid-Open No. 08-22953).

The transmissivity of TE polarized light in a slit 1 is denoted as $\epsilon^1_{TE}$, the transmissivity of TM polarized light in a slit 1 is denoted as $\epsilon^1_{TM}$, the transmissivity of TE polarized light in a slit 2 is denoted as $\epsilon^2_{TE}$, and the transmissivity of TM polarized light in a slit 2 is denoted as $\epsilon^2_{TM}$. Thus a light intensity $I_1(x)$ for an image plane obtained by scanning a slit 1 and a light intensity $I_2(x)$ for an image plane obtained by scanning a slit 2 is expressed in Equation (1).

$$I_1(x) = \epsilon^1_{TE} \cdot I_{TE} + \epsilon^1_{TM} \cdot I_{TM}$$

$$I_2(x) = \epsilon^2_{TE} \cdot I_{TE} + \epsilon^2_{TM} \cdot I_{TM} \quad (1)$$

Solving the simultaneous equations for $I_{TE}$ and $I_{TM}$ obtains a light intensity $I_{TE}$ for the image plane of TE polarized light and a light intensity $I_{TM}$ for the image plane of TM polarized light.

However in the method of measuring contrast as discussed in Japanese Patent Application Laid-Open No. 2007-281463, the contrast change corresponding to change in the ratio of polarization displays low sensitivity. Furthermore in the absence of accurate control of the slit position, the contrast sometimes does not display a one to one relationship with the ratio of polarization, which therefore complicates the calculation of change in the ratio of polarization using contrast change.

FIG. 16 illustrates a relationship of contrast and the ratio of polarization obtained by simulation. A light source having a wavelength of 193 nm was used and water was introduced between the final plane and the image plane of the optical system. A light intensity distribution was formed on the image plane having a periodic contrast of 1 and a half pitch of 45 nm. The slits were formed in the light shielding film made of tantalum with a thickness of 150 nm. A ratio of polarization RoP is defined as Is/(Is+Ip). Is denotes the light intensity of sigma (s) polarized light and Ip is the light intensity of pi (p) polarized light.

When a slit width is 80 nm, even when RoP is varied from 1 to 0.9, the contrast only displays a 2% change. Furthermore, when the slit width is 160 nm, since there are two corresponding RoP values at a contrast of 0.5 or less, it is not possible to determine which of the two RoP values applies only with reference to the contrast.

As discussed in Japanese Patent Application Laid-Open No. 08-22953, a method for calculating an image plane intensity for each polarization direction by scanning two slits cannot be applied to a case where an aerial image and the intensity distribution of the measured image plane changes non-linearly.

For example, as illustrated in FIG. 17, when the intensity of the aerial image is denoted as $Int0(x)$, a light intensity distribution S1(x) can be measured by one slit as a prescribed multiple of the aerial image. Using a constant a, it is expressed in Equation (2) as follows:

$$S1(x) = a \times Int0(x) \quad (2)$$

However when using the other slit to measure a light intensity distribution having a phase deviation from the aerial image such as S2(x), a prescribed multiple of the aerial image is not obtained and it is not possible to express S2(x) in the form of Equation (2). Consequently, it is sometimes the case that Equation (1) cannot be solved or that there is not a unique solution.

SUMMARY OF THE INVENTION

The present invention is directed to a method enabling highly accurate measurement of polarization characteristics and to a measuring apparatus therefor.

According to an aspect of the present invention, a measurement method is provided for measuring polarization characteristics of light on an image plane for a projected image of a mask pattern. The method comprises illuminating the mask with light from a light source and projecting an image of the mask pattern onto the image plane, displacing a first slit having a width less than or equal to the wavelength of the light source on the image plane, detecting light passing through the first slit and acquiring a first light intensity distribution with respect to the direction of displacement of the first slit, displacing a second slit having a width less than or equal to the wavelength of the light source on the image plane, detecting light passing through the second slit and acquiring a second light intensity distribution with respect to the direction of displacement of the second slit, determining respectively a position of a maximum value and a minimum value of the first light intensity distribution and using the light intensity at the respectively determined position in the second light intensity distribution to calculate an index value; and using information expressing a relationship between the index value and the polarization characteristics to obtain the polarization characteristics corresponding to the calculated index value.

According to another aspect of the present invention, a measurement apparatus is provided for measuring polarization characteristics of light on an image plane for a projected image of a mask pattern. The apparatus comprises a displacement unit displacing a first slit and a second slit having a width less than or equal to the wavelength of a light source on the image plane, a light receiving unit receiving light passing through the first slit and the second slit, and a calculation unit calculating the polarization characteristics using information from the light receiving unit. When the mask is illuminated with the light from the light source and an image of the mask pattern is projected onto the image plane, the measurement apparatus acquires a first light intensity distribution with respect to a direction of displacement of the first slit due to the displacement unit displacing the first slit on the image plane and the light receiving unit receiving light passing through the first slit, acquires a second light intensity distribution with respect to a direction of displacement of the second slit due to the displacement unit displacing the second slit on the image plane and the light receiving unit receiving light passing through the second slit, determines respectively a position of a maximum value and a minimum value of the first light intensity distribution from the calculation unit, uses the light intensity at the respectively determined positions in the second light intensity distribution to calculate an index value, and uses information expressing a relationship between the index value and the polarization characteristics to obtain the polarization characteristics corresponding to the calculated index value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
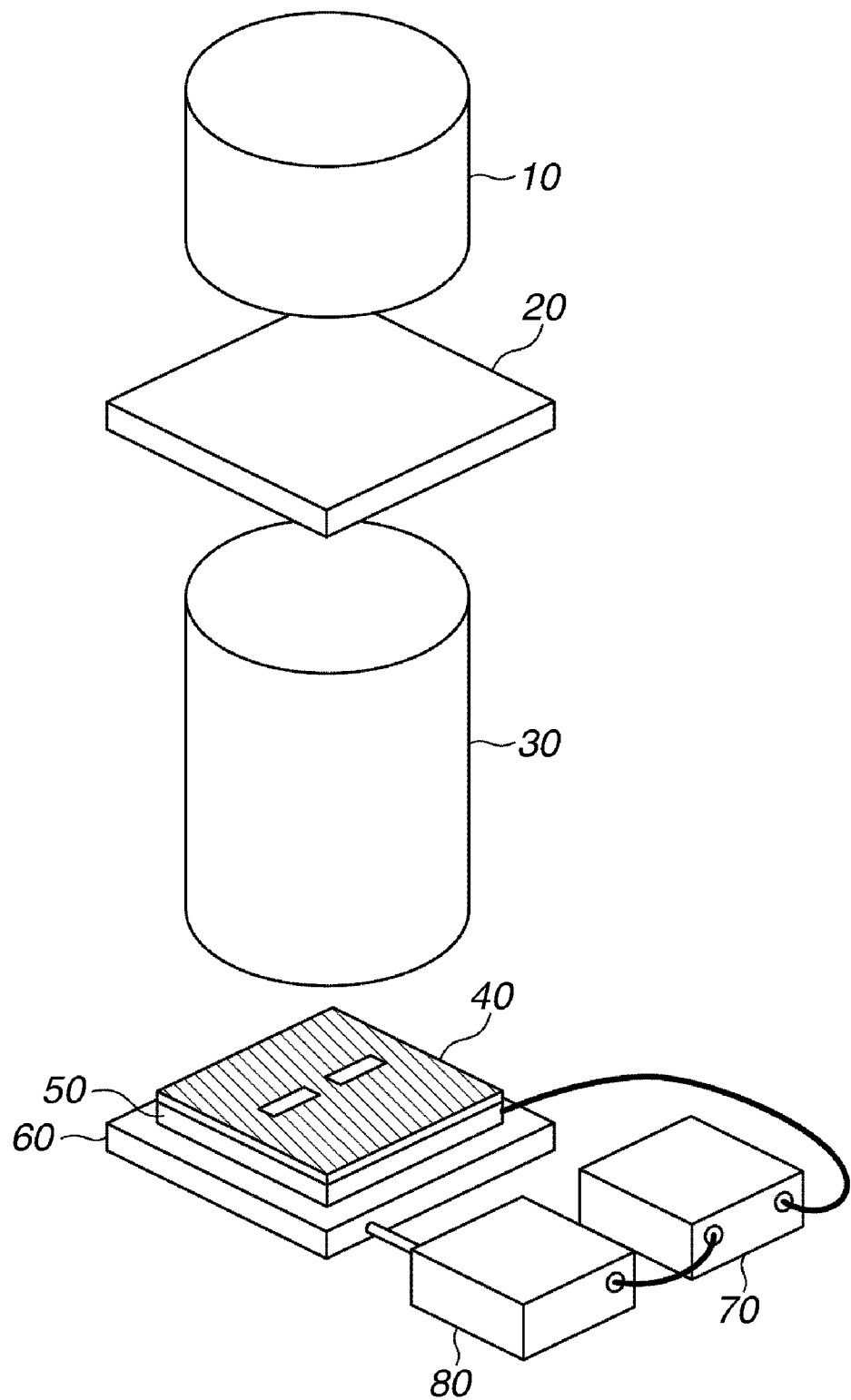
FIG. 1 is a schematic diagram of a measuring apparatus.

FIG. 1 is a schematic diagram of a measuring apparatus measurement apparatus for measuring polarization characteristics according to a first exemplary embodiment.

The measurement apparatus has a light source, an illumination optical system 10 illuminating light from the light source onto a mask 20, a projection optical system 30, a sensor 50, and a stage 60 used to displace the sensor 50. A signal processing unit 70 processing signals from the sensor 50 and a control unit 80 driving and controlling the stage 60 with reference to a signal output from the signal processing unit 70 are provided.

Light from the light source is refracted, reflected, or diffracted by the illumination optical system 10 and illuminated on the mask (reticle) 20. A pattern is formed on the mask 20 with a light shield film formed by a material such as chrome.

Transmitted light and diffracted light according to the pattern are generated by illuminating light onto the mask 20 having the pattern.

The pattern used in a semiconductor exposure apparatus or a crystal exposure apparatus may be a circuit pattern for transcription onto a substrate such as a wafer or may be a measurement-specific pattern.

The transmitted light or diffracted light generated by the pattern on the mask 20 is illuminated on the projection optical system 30. The projection optical system 30 forms an image of the pattern of the mask 20 on an image plane. The image plane of the projection optical system 30 forms an aerial image 40 representing the light intensity distribution generated according to the pattern of the mask 20, the characteristics of the projection optical system 30, the illumination optical system 10, and the light source.

The sensor 50 performs a photoelectric conversion on light received by a light receiving element from the aerial image 40 through the alignment port and the slit of the sensor 50 and outputs an electrical signal to a signal processing unit 70.

The signal processing unit 70 acting as a calculation unit applies a calculation process to the signal output from the sensor 50 and outputs a signal corresponding to the calculation result to a control unit 80. The control unit 80 controls the driving operation of the stage 60 based on the signal from the signal processing unit 70.

Figure 2:
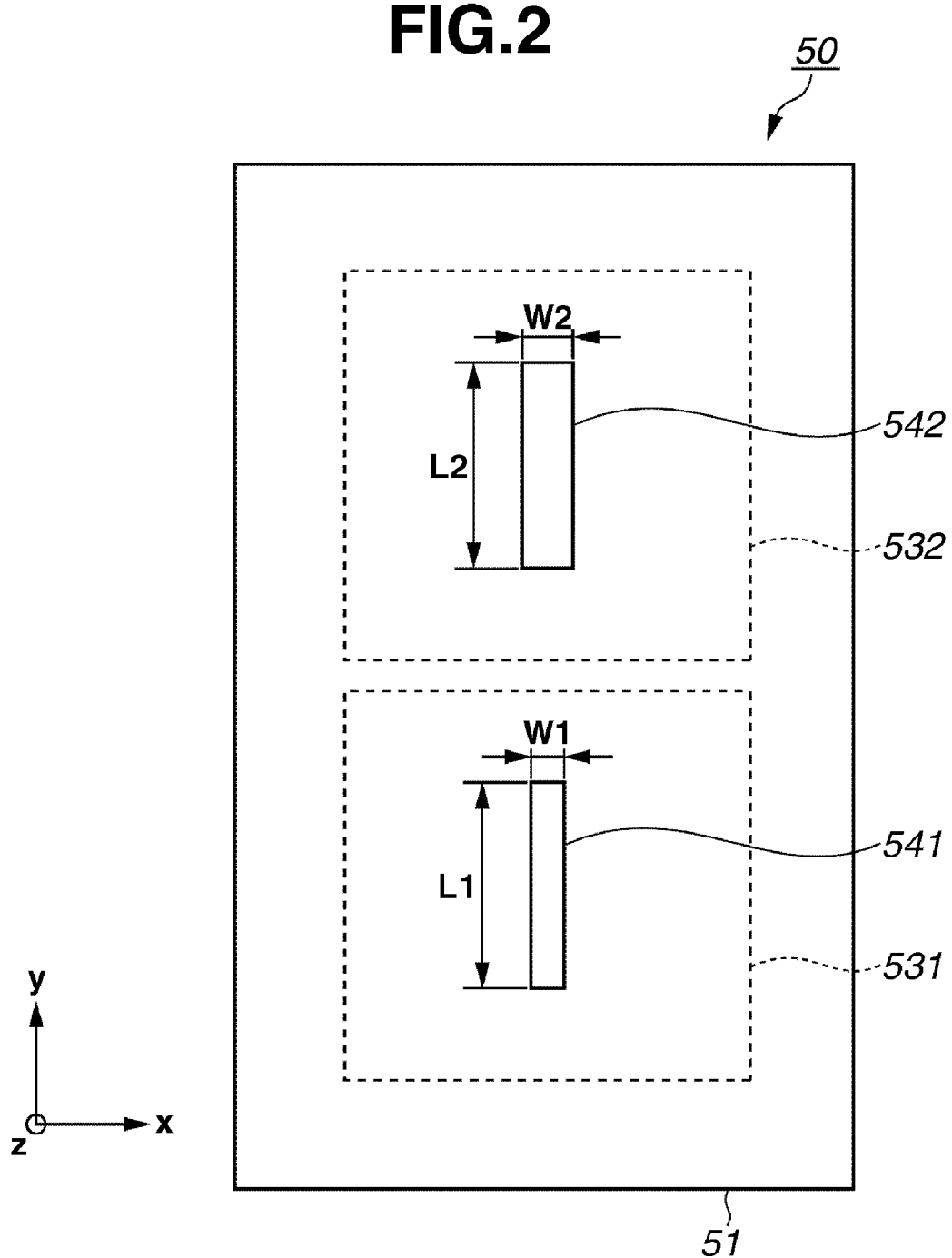
FIG. 2 is a top plan view of a sensor according to a first exemplary embodiment.

FIG. 2 is a top plan view illustrating a portion of the sensor 50 where slits are formed. A light shielding film 51 is provided on the sensor 50 and a first slit 541 and a second slit 542 are formed in the light shielding film 51.

When a width in a shorter direction (x direction) of the first slit 541 is denoted as W1 and a width in a shorter direction (x direction) of the second slit 542 is denoted as W2, the inequalities $W1 \leq \lambda$, and $W2 \leq \lambda$ must be satisfied for the slit transmissivity to vary depending on the direction of polarization. Herein $\lambda$ denotes the wavelength of the light source. In other words, W1 and W2 must take a value less than or equal to the wavelength of the light source.

A length L1 of the first slit 541 in a longitudinal direction (y direction) and a length L2 of the second slit 542 in a longitudinal direction (y direction) satisfy the inequalities $L1 \geq 10 \times \lambda$, $L2 \geq 10 \times \lambda$. In this manner, a slit is longer in comparison with the wavelength $\lambda$ of the light source, and consequently the light transmitted from the slit displays a lower polarization dependency with respect to a longitudinal direction of the slit than with respect to a shorter direction of the slit.

Furthermore, since the diffraction effect by the slit with respect to a longitudinal direction is small, the angle of diffraction is reduced. A reduction in the angle of diffraction in a longitudinal direction causes a concentration in the energy of the diffracted light in a direction perpendicular to the longitudinal direction and enables an increase in the light incident upon the light receiving element.

Figure 3:
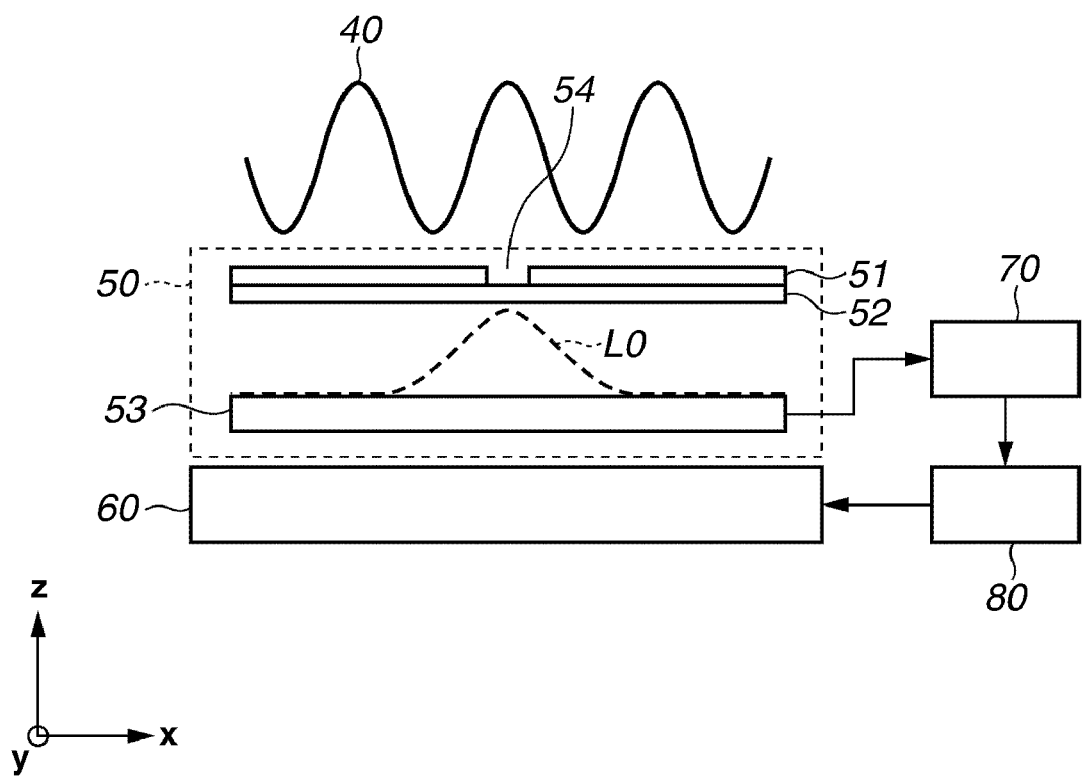
FIG. 3 is a sectional view of a sensor according to the first exemplary embodiment.

FIG. 3 is a sectional view of the sensor 50 along the xz plane. The light shielding film 51 is formed on a substrate 52 allowing passage of light. In the present exemplary embodiment, an aerial image 40 is formed as illustrated in FIG. 3 and after a portion of the aerial image 40 passes through the slit 54, it is incident on the photoelectric conversion unit (light receiving unit) 53.

The photoelectric conversion unit 53 is divided into a two-dimensional array. Signals from the photoelectric conversion unit 53 are input into the signal processing unit 70 and are suitably stored in a memory.

Figure 4:
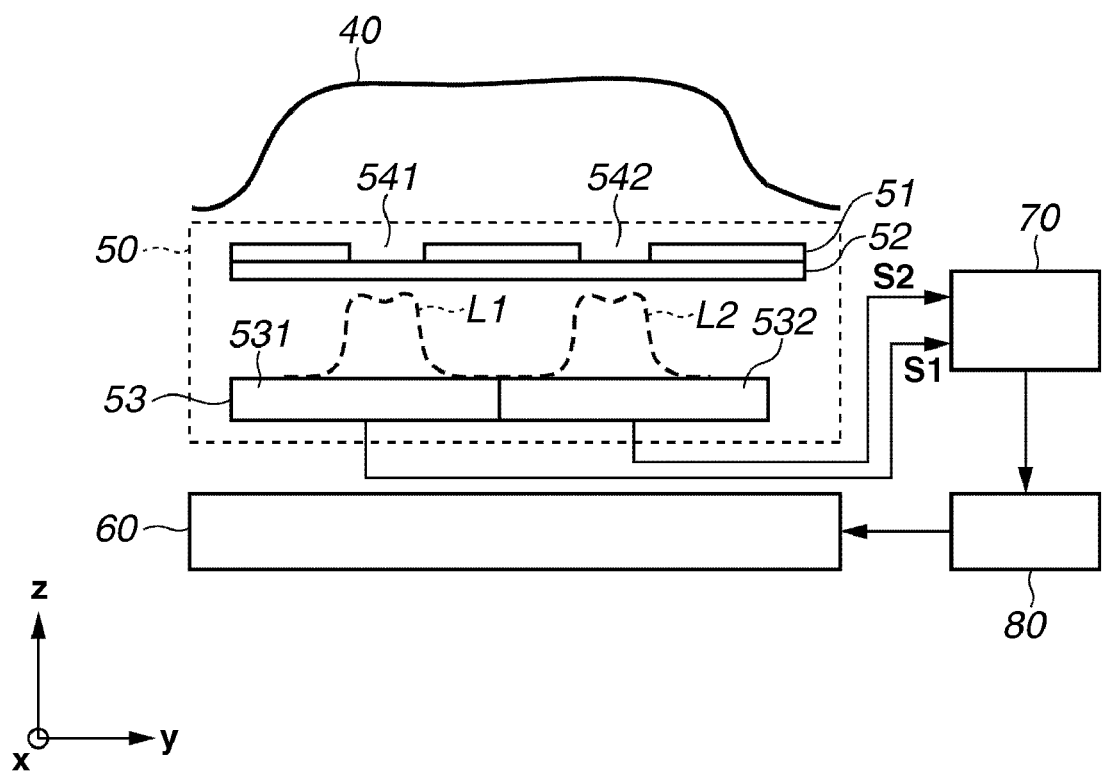
FIG. 4 is a sectional view of a sensor according to the first exemplary embodiment.

FIG. 4 is a sectional view of a sensor 50 along the yz plane. An aerial image 40 in the yz plane has a light intensity distribution as illustrated in FIG. 4. Light passing through a first slit 541 and light passing through a second slit 542 respectively irradiate different light receiving units.

Light passing through the first slit 541 undergoes photoelectric conversion in a first light receiving unit 531 disposed to substantially overlap with the slit 541 with respect to the z direction, and then is output as an electrical signal S1. Light passing through the second slit 542 undergoes photoelectric conversion in a second light receiving unit 532 disposed to substantially overlap with the second slit 542 with respect to the z direction, and then is output as an electrical signal S2.

Figure 5:
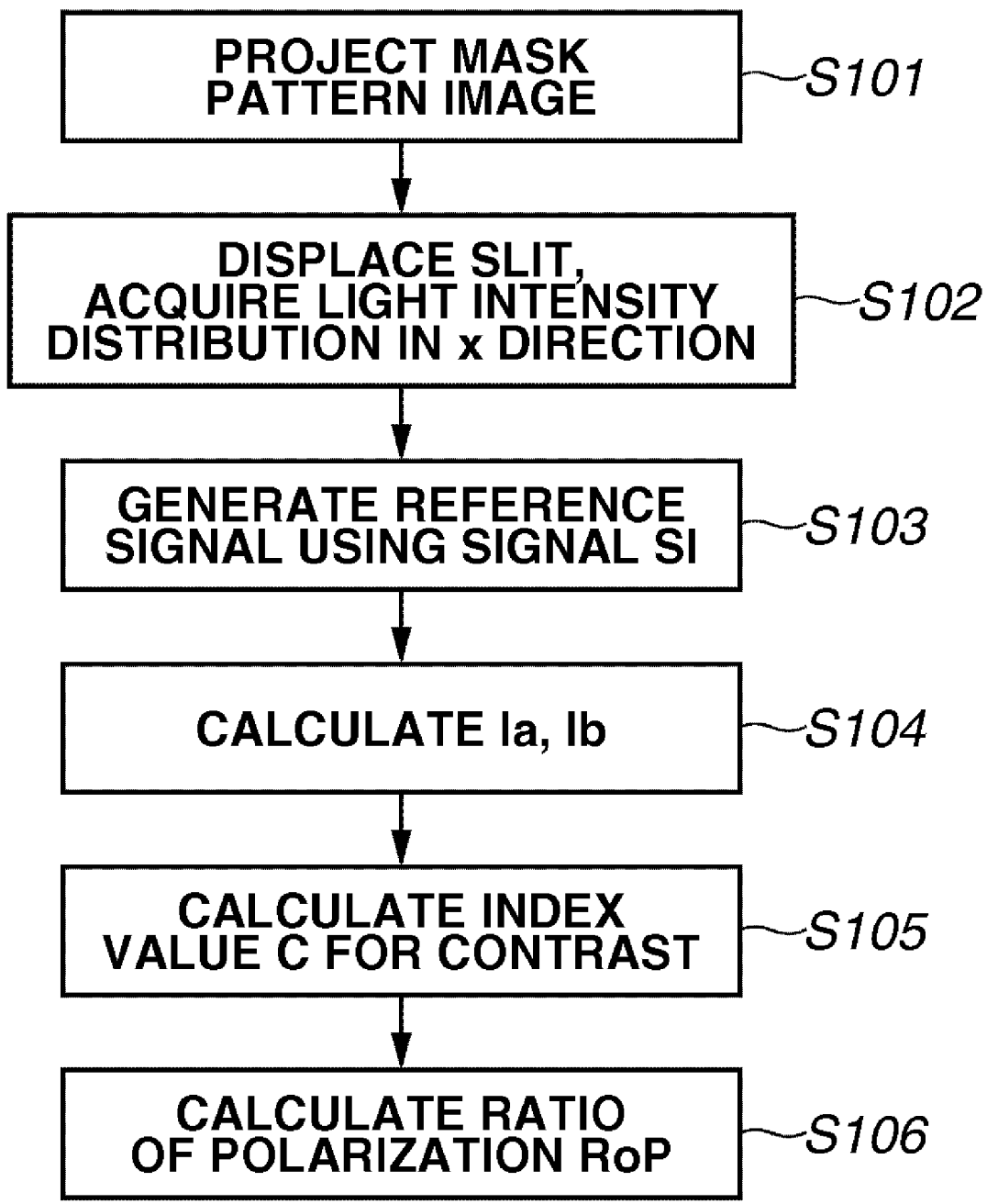
FIG. 5 is a flowchart illustrating a method for measuring polarization characteristics.
Figure 6:
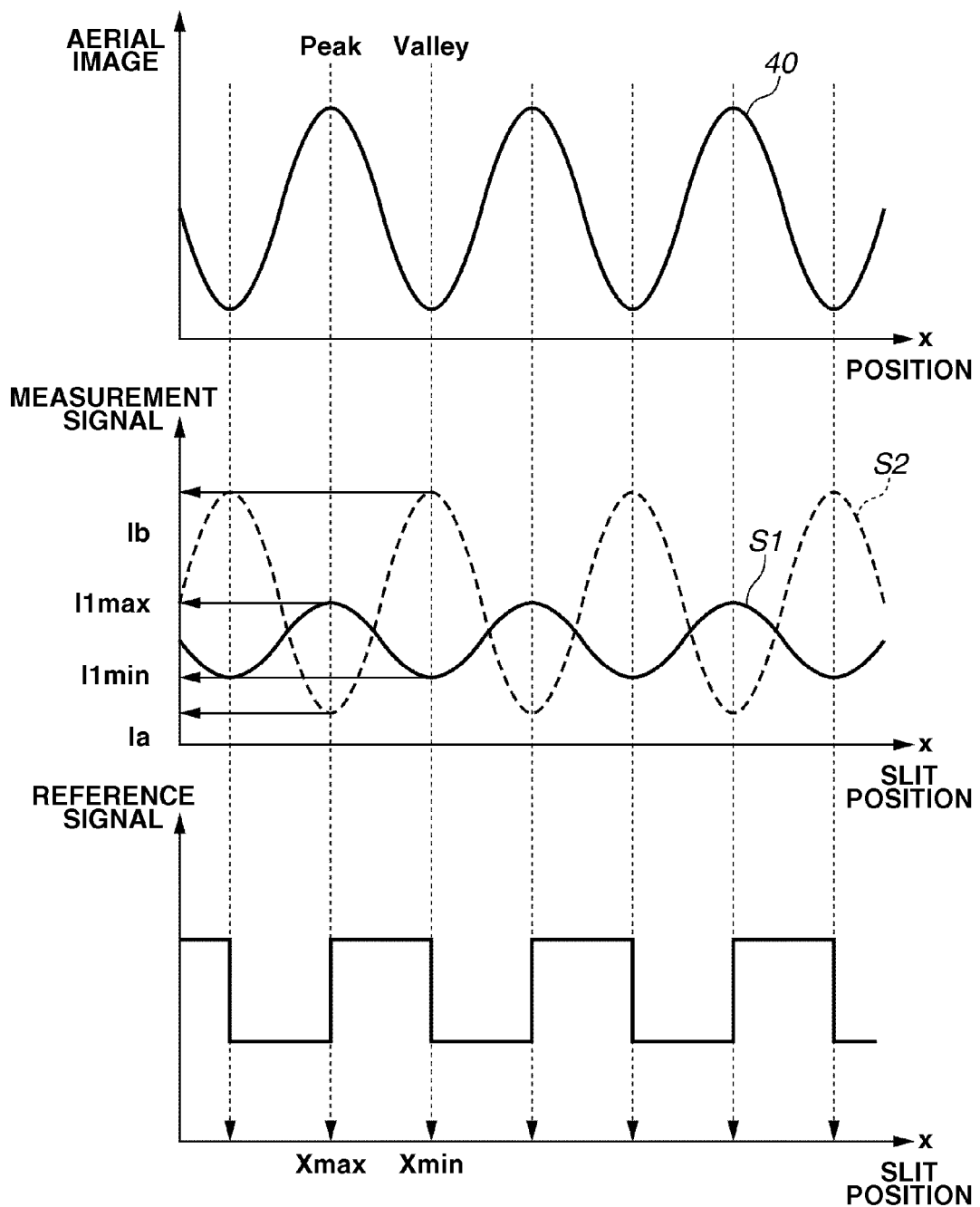
FIG. 6 illustrates an example of a signal output from the sensor.

Next, a method for measuring polarization characteristics using the sensor 50 will be described. FIG. 5 is a flowchart illustrating a method of measurement. FIG. 6 illustrates an example of a measurement signal.

Firstly, in step S101, an illumination optical system 10 is used to illuminate a mask 20 and the image of a pattern on the mask 20 is projected onto an image plane using a projection optical system 30. An aerial image 40 having a light intensity distribution as illustrated in FIG. 3 and FIG. 4 is formed on the image plane of the projection optical system 30.

A sampling theorem is satisfied by using stage 60 to displace (scan) the sensor 50 in an x direction by a distance (a distance less than or equal to half the pitch of the aerial image 40) corresponding to a frequency at least twice higher than the space frequency of the aerial image 40. When the longitudinal direction of the slit and the direction of the stripe in the aerial image 40 are not parallel, there is an adverse effect on the modulation of the measurement signal and alignment of the angle or position of the slit is performed as required.

Then in step S102, the sensor 50 is displaced in an x direction to measure the intensity of light passing through the slit in the sensor 50 and obtain information regarding the light intensity distribution in an x direction, which is the direction of slit displacement. Information obtained by scanning the slit is termed a scanning signal.

Light passing through the first slit 541 is received by the first light receiving unit 531 and input into the signal processing unit 70 as a signal S1 from the first light receiving unit 531. Signals S1 that vary according to the displacement of the first slit 541 are accumulated by the signal processing unit 70 to obtain a first light intensity distribution with respect to the direction of displacement of the first slit 541.

Similarly, light passing through the second slit 542 is received by the second light receiving unit 532 and input into the signal processing unit 70 as a signal S2 from the second light receiving unit 532. Signals S2 that vary according to the displacement of the second slit 542 are accumulated by the signal processing unit 70 to obtain a second light intensity distribution with respect to the direction of displacement of the second slit 542.

Data related to a first light intensity distribution and a second light intensity distribution obtained in the above manner is subjected to a calculation processing operation in the signal processing unit 70.

The first light intensity distribution and the second light intensity distribution vary in the similar period to the aerial image 40. Xmax in FIG. 6 denotes the position at which the aerial image takes a maximum value (Peak) and Xmin denotes the position at which the aerial image takes a minimum value (Valley).

The position that takes a maximum value (I1max) within the first light intensity distribution (S1) coincides with the position Xmax, which denotes the maximum intensity of the aerial image 40. The position that takes a minimum value (I1min) within the first light intensity distribution (S1) coincides with the position Xmin, which denotes the minimum intensity of the aerial image 40.

The position that takes a maximum value within the second light intensity distribution (S2) is different from the position Xmax that denotes the maximum intensity of the aerial image 40 and coincides with the position Xmin at which the aerial image 40 has a minimum intensity. The maximum and the minimum intensities represent the maximum and the minimum in a single period of variation in the aerial image intensity.

Even when the center of the second slit 542 is positioned at the maximum intensity of the aerial image 40, the signal S2 takes a minimum value. This is due to the fact that the angle of incidence of light forming the aerial image is large and the slit is short in comparison with the wavelength of the light source. Consequently the light transmissivity of the slit varies depending on a position.

Then in step S103, the signal processing unit 70 generates a reference signal as illustrated in FIG. 6, based on a value of the first light intensity distribution (S1), to discriminate between the maximum position and the minimum position of the aerial image 40. In step S104, the reference signal is used to obtain a value Ia of signal S2 when the second slit 542 is positioned at the position Xmax where the aerial image takes a maximum value and a value Ib when the second slit 542 is positioned at the position Xmin where the aerial image takes a minimum value.

In step S105, the signal processing unit 70 calculates an index value C as a contrast value.

$$C=(Ia-Ib)/(Ia+Ib) \quad (3)$$

Next, an actual example of the relationship between the polarization characteristics of light forming the aerial image and the index value C will be described. It is assumed that a wavelength was 193 nm, water was filled at the image plane of an optical system, and an aerial image was formed having a half pitch of 45 nm and a periodic contrast of 1. The contrast in the aerial image is given by $(p-q)/(p+q)$ where a maximum value for light intensity is denoted as p and a minimum value as q.

Figure 7:
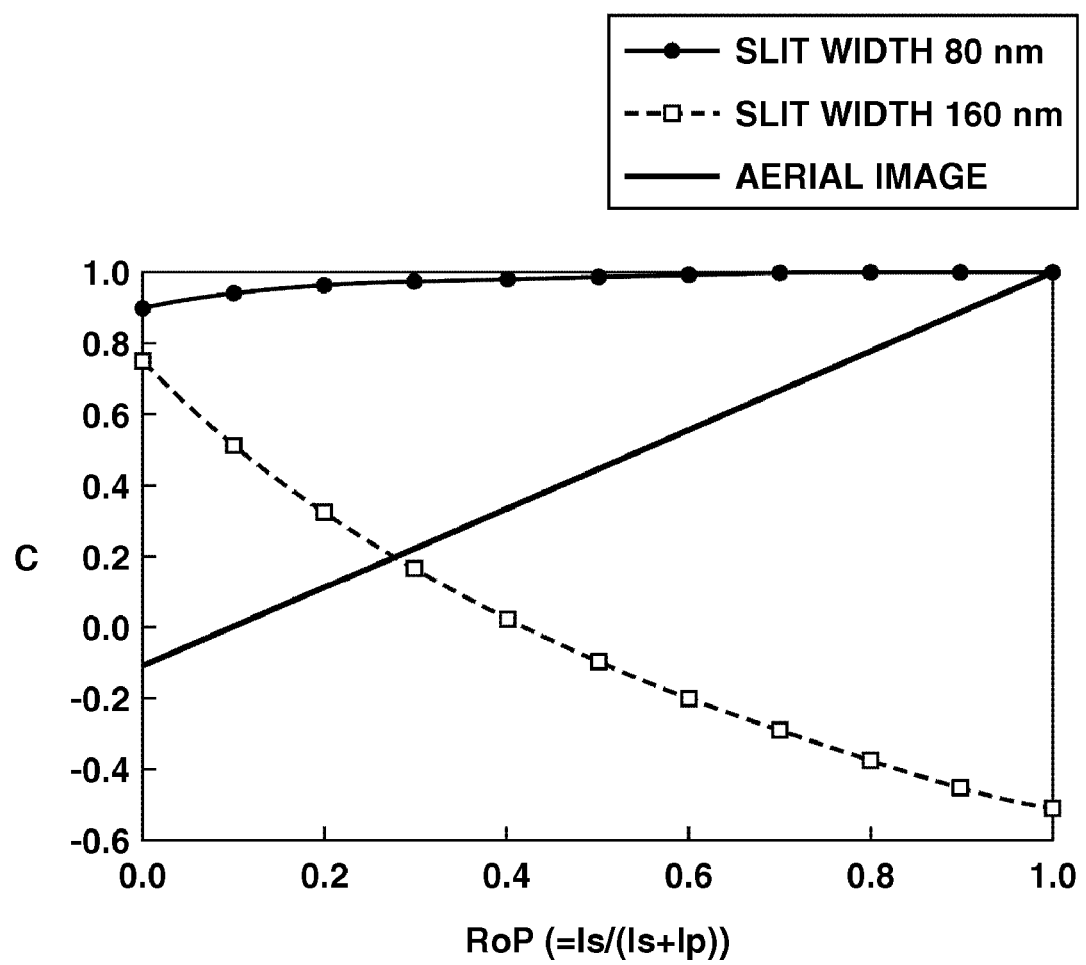
FIG. 7 illustrates a relationship between an index value C and a ratio of polarization RoP.

FIG. 7 illustrates a relationship between the index value C for contrast and the ratio of polarization RoP defining the polarization characteristics of light forming the aerial image. When s polarized light is the principal component (RoP takes a value of approximately 1), the output signal from the sensor when the center of the slit is positioned at the maximum value of the intensity distribution of the aerial image takes a value of Ia. The output signal from the sensor when the center of the slit is positioned at the minimum value of the intensity distribution of the aerial image takes a value of Ib.

As the first light intensity distribution (S1) illustrated in FIG. 6, when the position for maximum intensity of the aerial image is the same as the position of the maximum value in the first light intensity distribution (S1), the index value C takes a positive value.

Conversely, as the signal S2, when the position for maximum intensity of the aerial image is the same as the position of the minimum value in the second light intensity distribution (S2), the index value C takes a negative value.

In FIG. 7, when the slit width is 80 nm, although the index value C normally takes a positive value, if the slit width is 160 nm, the index value C varies from a negative to a positive value according to the change in the RoP from 1 to 0.

The index value C can be calculated using the information obtained by measuring the light transmitted through the slit having width of 80 nm as a first light intensity distribution (S1) and the light transmitted through the slit having width of 160 nm as a second light intensity distribution (S2).

As illustrated in FIG. 7, RoP can be uniquely determined using the index value calculated from the maximum value and the minimum value of the second light intensity distribution (S2). As a result, in step S106, the polarization ratio RoP forming the aerial image can be determined from the index value C by preparing a formula or table in advance expressing the relationship between the second light intensity distribution and RoP, and then referring to the formula or table.

The polarization characteristics of the light forming the aerial image can be accurately measured using this type of calculation operation process, thereby enabling an improvement to the measurement accuracy.

Control of aberration in the projection optical system or polarization control in the illumination optical system can be applied by using the measured RoP to converge towards a RoP preferred for image formation.

Figure 8:
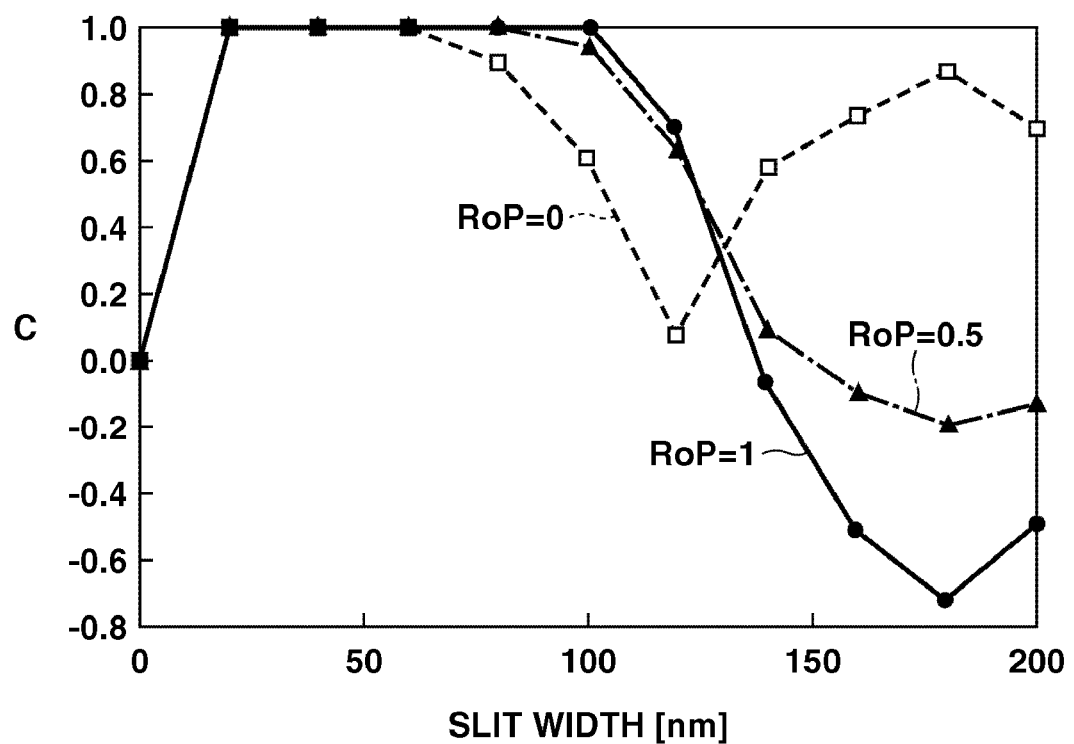
FIG. 8 illustrates a relationship between an index value C and a slit width.

Next, the relationship between the slit width and the index value C will be described. FIG. 8 illustrates the slit width dependency of a contrast index value C when the RoP takes values of 0, 0.5, and 1. The conditions, as described above, are a wavelength of 193 nm, filling water at the image plane of an optical system, and forming an aerial image having a half pitch of 45 nm and a periodic contrast of 1.

When the slit width is less than or equal to 100 nm, the change in the index value C due to RoP is small. However an increase in the slit width causes a corresponding increase in the change due to RoP. When the index value C takes a positive value, the same tendency will be displayed in the signal obtained by measuring the light transmitted through the slit and in the image intensity of the aerial image formed when s polarization light is the principal component.

Accordingly, if the width of the first slit 541 is made smaller than the second slit 542 so that the sign of the index value C does not change, the signal obtained by measuring light transmitted from the first slit 541 has the same tendency as the image intensity of the aerial image having a principal component of s polarized light.

Furthermore the relationship between the index value C and the polarization ratio RoP changes depending on the slit width. Therefore, slit width information is acquired using a method such as measuring the slit width in advance with a scanning electron microscope (SEM) or obtaining the slit width from the light intensity distribution for light passing through the slit.

It is possible to obtain a value of RoP from the obtained index value C using the information for the slit width and the information expressing the relationship between the index value C and RoP.

Figure 9:
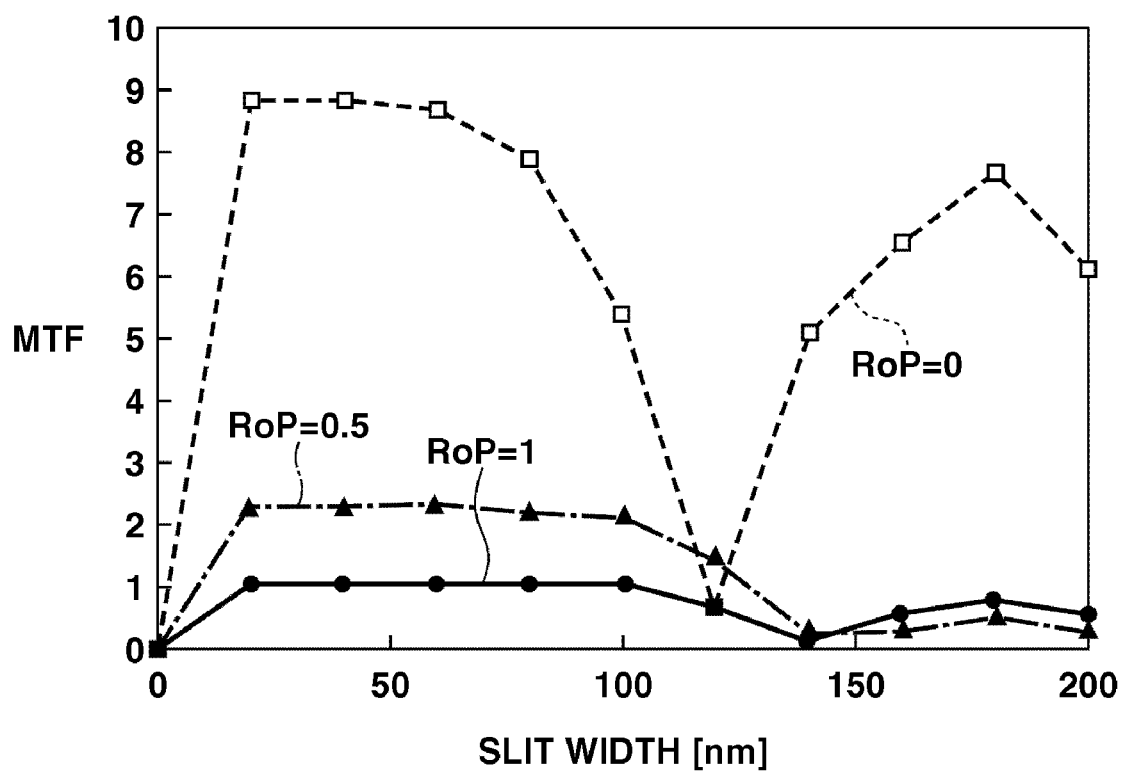
FIG. 9 illustrates a relationship between MTF and a slit width.

FIG. 9 illustrates the relationship between a modulation transfer function (MTF) and the slit width. MTF expresses the ratio of the absolute value of the index value C and the contrast of the aerial image.

$$MTF \equiv |C|/\text{contrast of the aerial image} \quad (4)$$

As illustrated in FIG. 9, when the polarization ratio RoP is 1 and the slit width is small, the value of MTF is approximately 1 since the contrast of the aerial image and the index value C are both approximately 1.

However when the ratio of polarization RoP has a value of 0, although the contrast of the aerial image falls below 1, since the reduction in the index value C is small in comparison with the reduction in the contrast of the aerial image, the value of MTF increases. Therefore, even when RoP takes a value of nearly 0 and the contrast of the aerial image is reduced, it is possible to calculate an index value C. Consequently highly accurate polarization characteristics can be measured.

Next, a method for measuring the aerial image itself using measurement data of the sensor obtained by performing the above measuring operations will be described.

Figure 10:
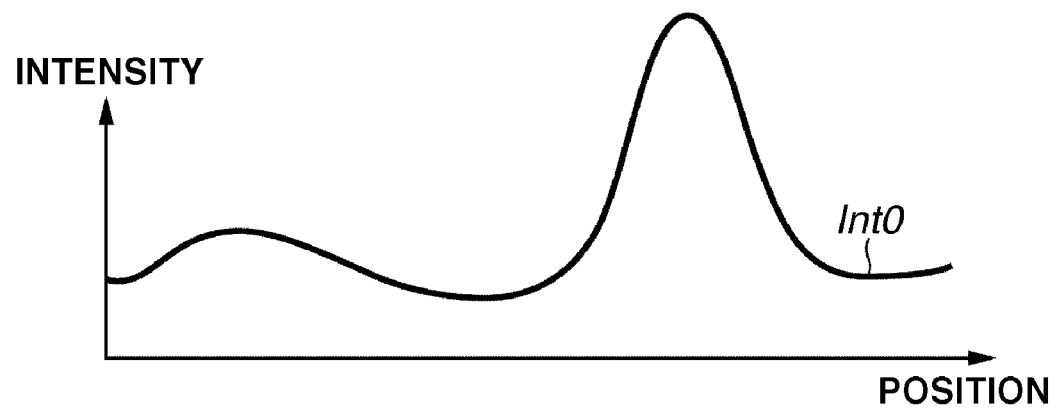
FIG. 10 is a schematic diagram illustrating a generalized scanning signal.
Figure 10:
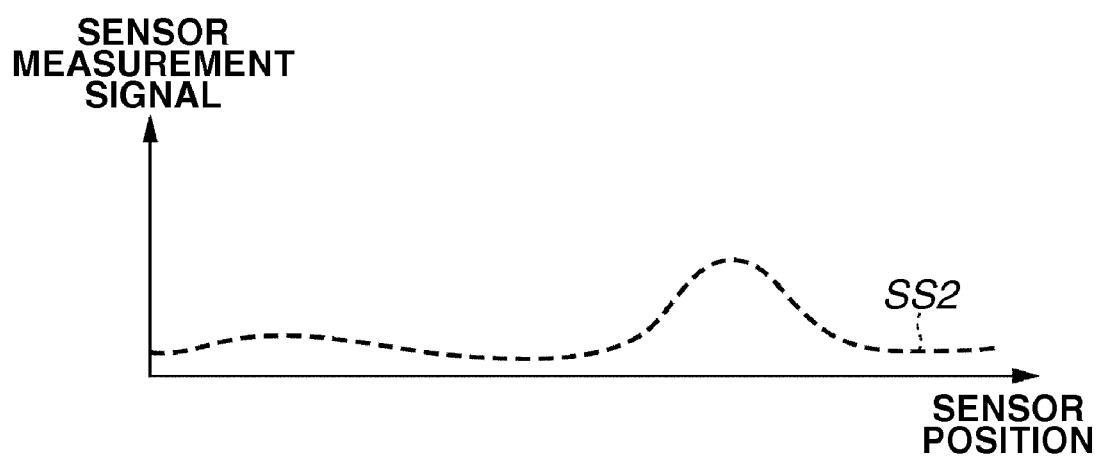

FIG. 10 is a schematic view of a generalized scanning signal. When the intensity distribution of the stripe-shaped aerial image formed by the optical system is denoted as Int0, a scanning signal is obtained, which is different from the original signal of the aerial image as in S2.

The scanning signal is a signal obtained by detecting the light passing through the slit formed in the light shielding film having a limited thickness. Therefore the transmissivity of the slit in an actual aerial image is a convoluted signal.

The transmissivity of the slit varies depending on the ratio of polarization of light forming the aerial image. Thus a recovery processing operation such as deconvolution is applied to the slit signal by referring to a transmissivity of the slit taking into account the pre-stored polarization ratio or by using a computer to calculate a transmissivity of the slit taking into account the polarization ratio.

In this manner, the light intensity distribution can be measured in the same manner as an actual aerial image. The method described above provides a method for highly accurate measurement of an aerial image without dependency on the slit shape and polarization ratio.

When applying the recovery process, the accuracy of the recovery process can be improved by obtaining in advance information including the wavelength width of the light source, the polarization ratio, the aberration of the optical system or by referring to measurement values obtained using other sensors than those of the optical system.

Next, a second exemplary embodiment of the present invention will be described. The disposition of the slit is different from that of the first exemplary embodiment.

Figure 11:
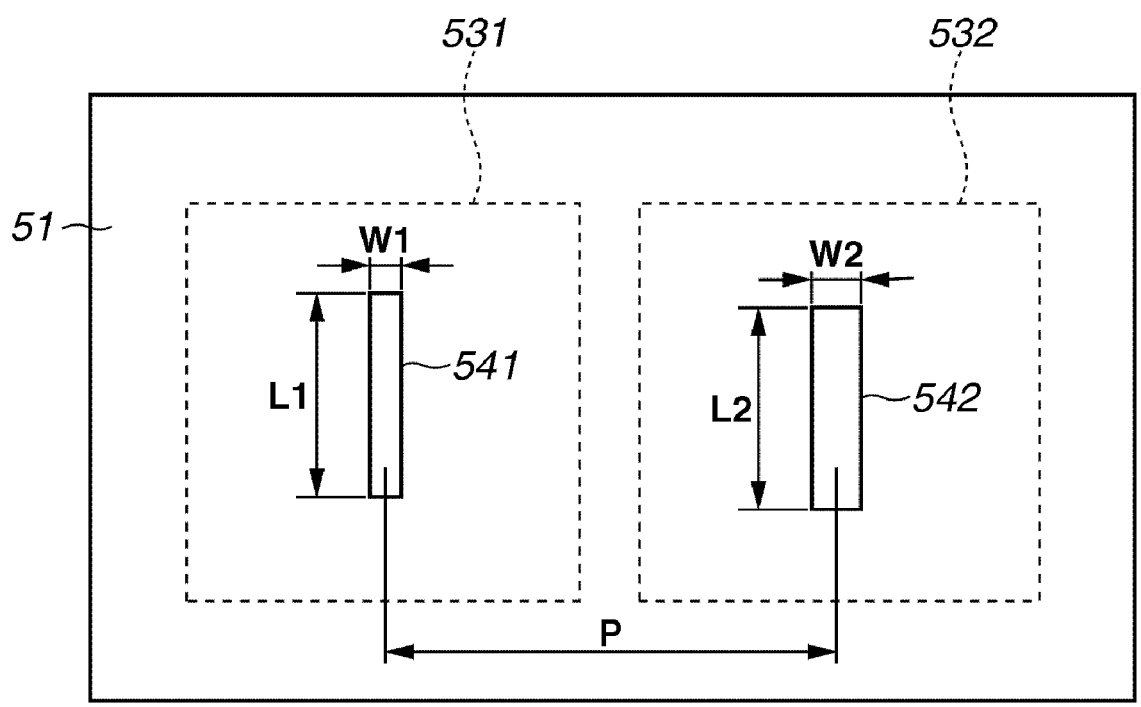
FIG. 11 is a top plan view of a sensor according to a second exemplary embodiment.

In the first exemplary embodiment, the first slit 541 and the second slit 542 are disposed along the y direction. However in the present exemplary embodiment, as illustrated in FIG. 11, the first slit 541 and the second slit 542 are disposed along the x direction. The center of the first slit 541 and the second slit 542 are separated by a distance P.

With this arrangement, the slit performs scanning in the x direction and the first slit 541 and the second slit 542 have positions having different values of the aerial image. However, if the distance P is known in advance, the measurement position can be corrected in signals obtained by measuring the light passing through the first slit 541 and signals obtained by measuring the light passing through the second slit 542, taking into account the distance P.

Next, a third exemplary embodiment of the present invention will be described. The disposition of the slit is different from that of the above exemplary embodiments.

Figure 12:
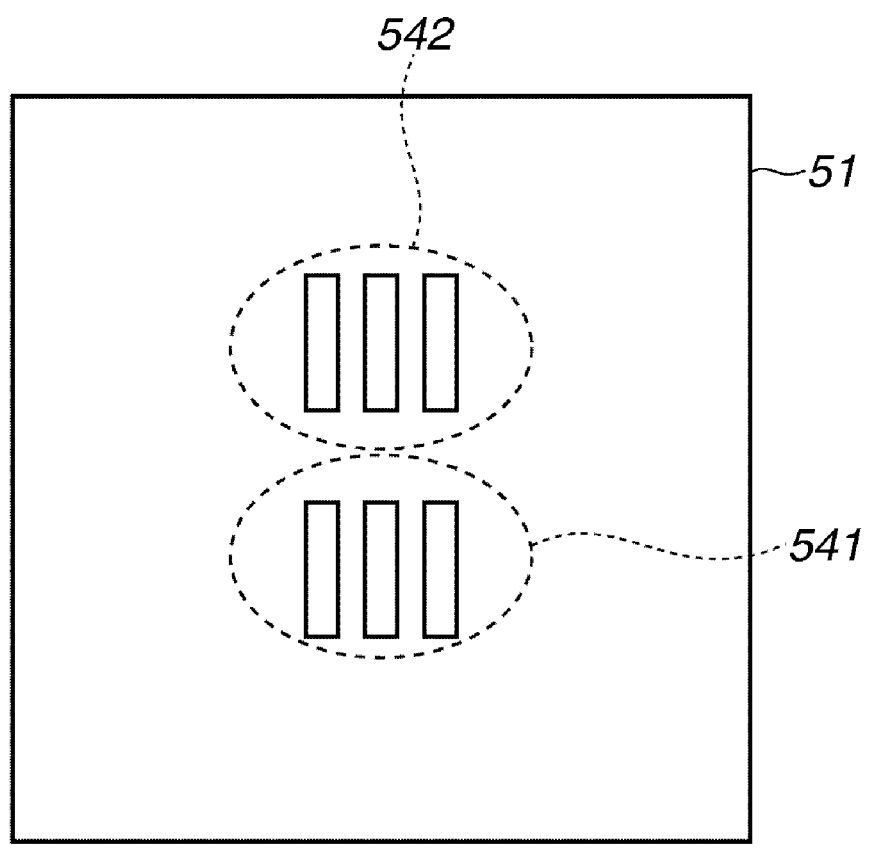
FIG. 12 is a top plan of a sensor according to a third exemplary embodiment.

In the present exemplary embodiment, a plurality of first slits 541 and a plurality of second slits 542 are disposed as illustrated in FIG. 12. As described above, the width of each first slit 541 is W1 and the width of each second slit 542 is W2.

Since the plurality of slits are disposed in positions corresponding to an integral multiple of the period of the aerial image, the total amount of light passing through the plurality of slits is increased in comparison with providing only a single slit and consequently the signal to noise ratio (SN ratio) is improved, thereby improving the measurement accuracy.

Figure 13A:
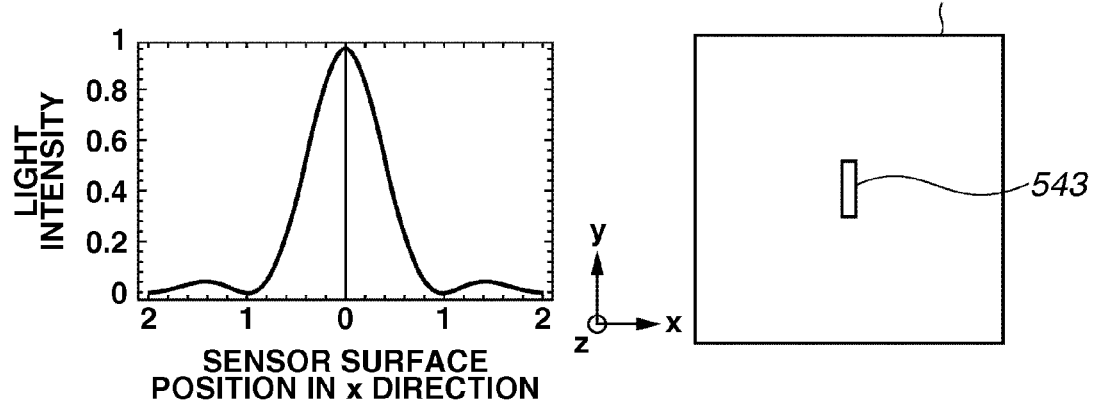
FIGS. 13A and 13B each illustrates an intensity distribution on a light receiving plane when a one slit and a plurality of slits are provided respectively.
Figure 13B:
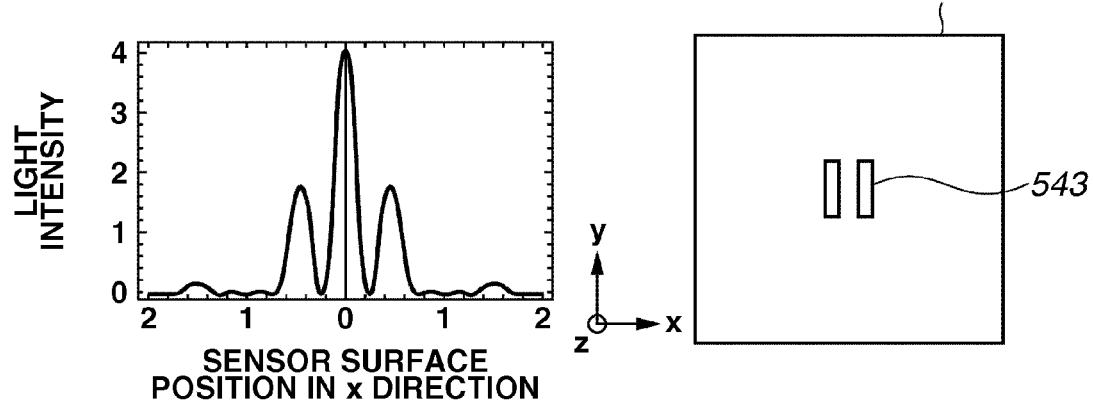
Figure 14:
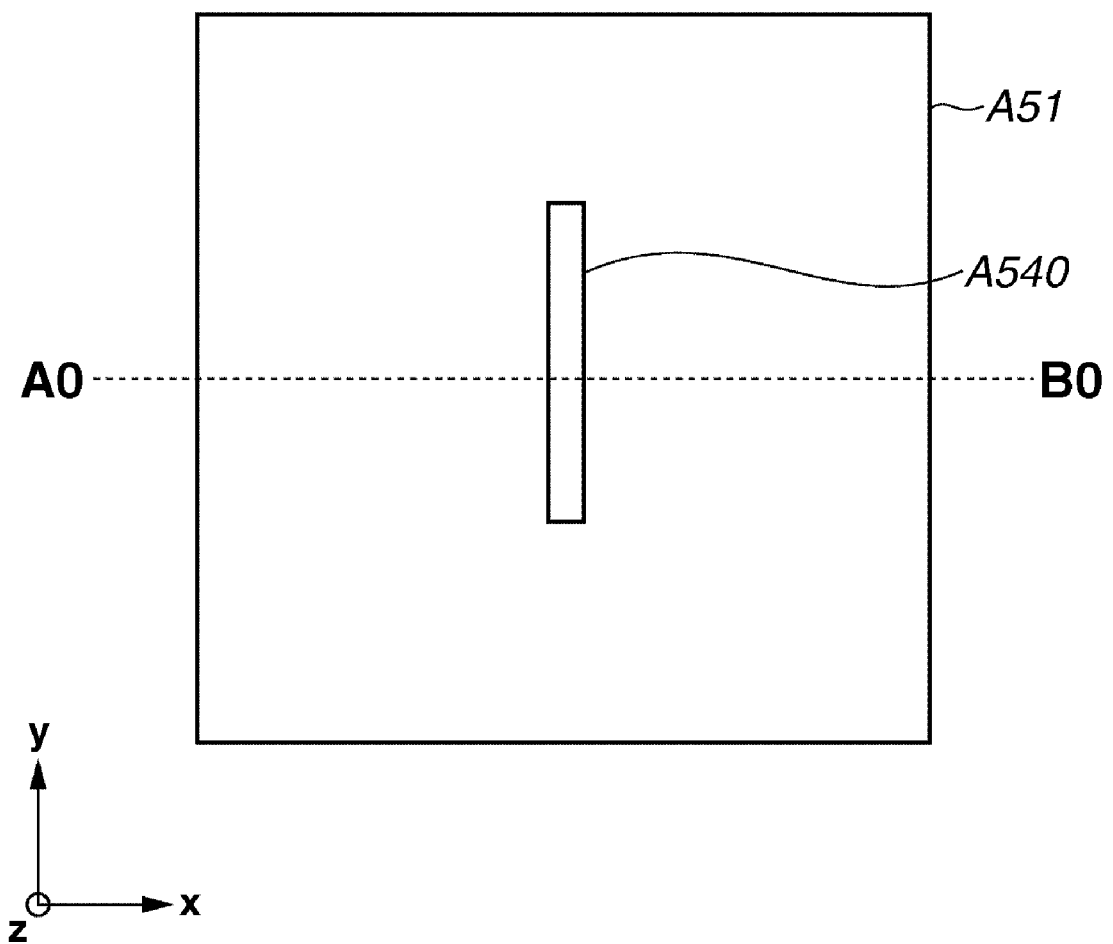
FIG. 14 is a top plan view of a sensor.
Figure 15:
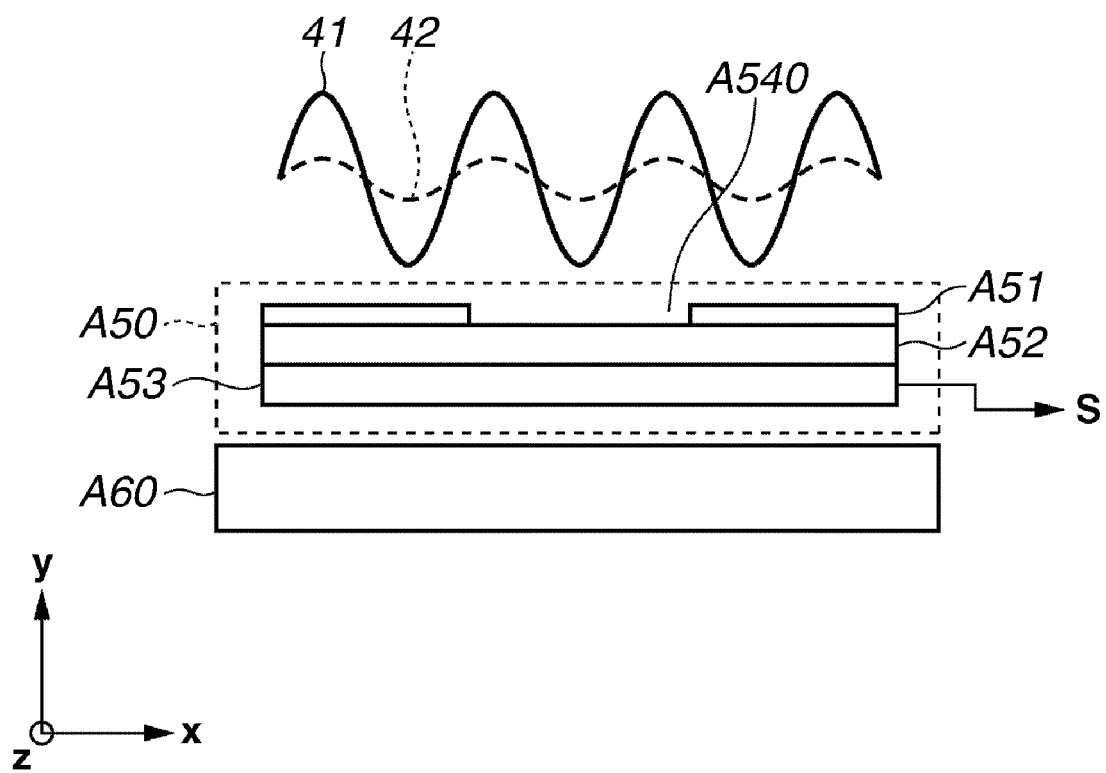
FIG. 15 illustrates a sectional view of a sensor.
Figure 16:
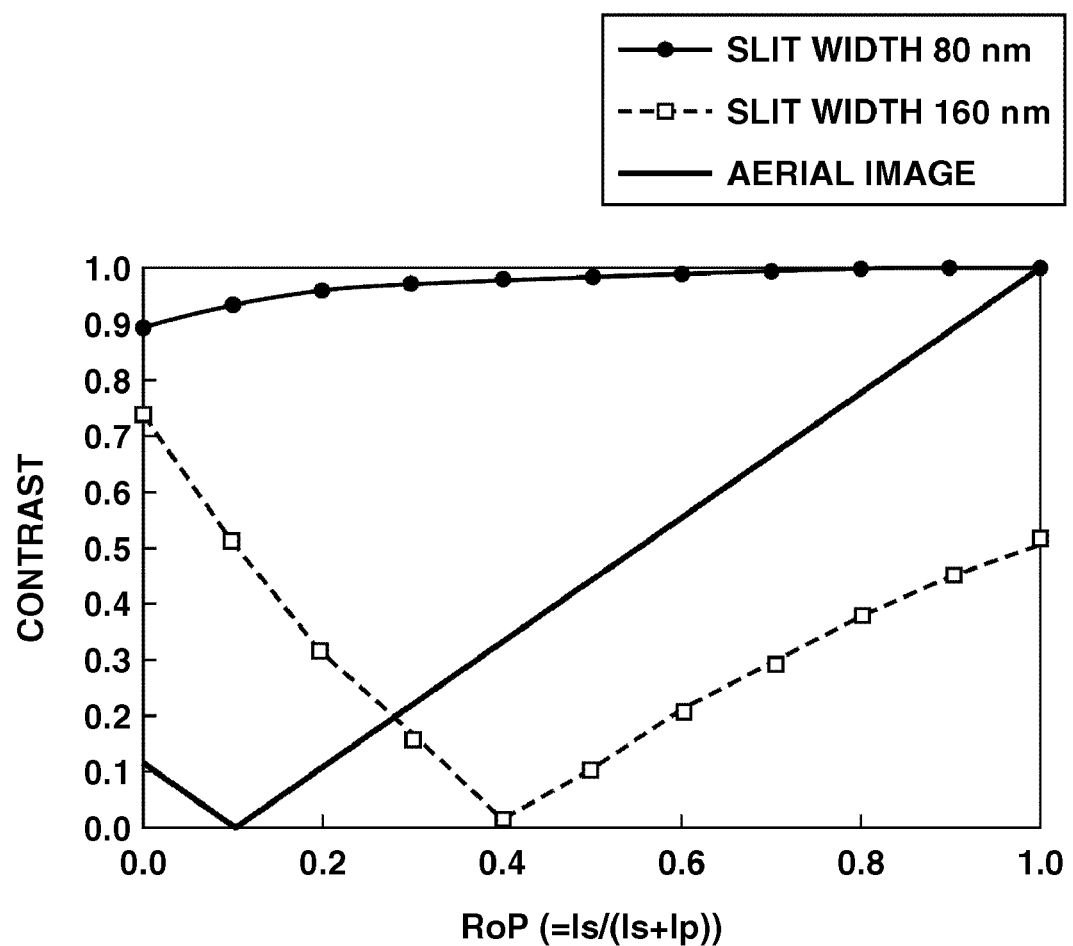
FIG. 16 illustrates a relationship between contrast and ratio of polarization.
Figure 17:
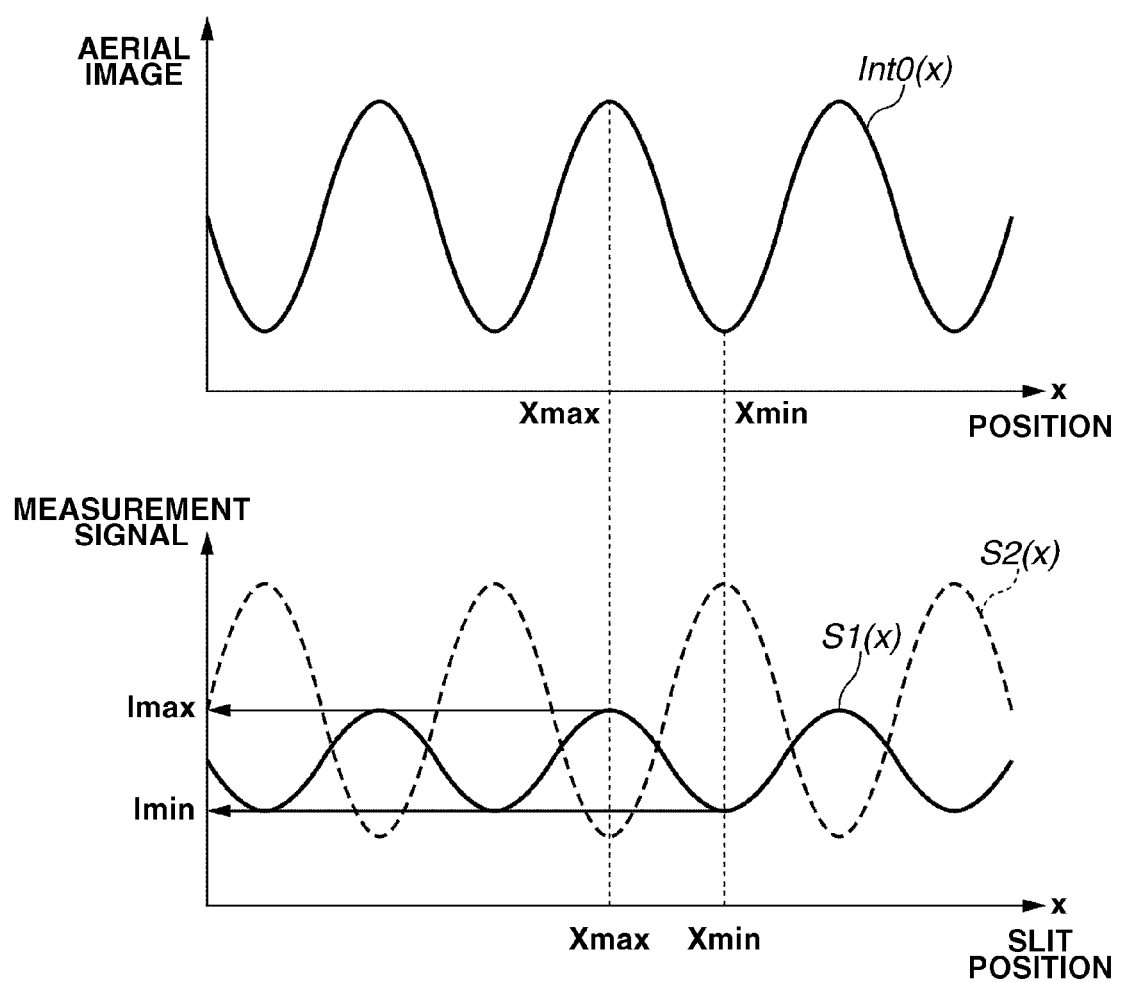
FIG. 17 illustrates a waveform of a measurement signal and an aerial image.

FIGS. 13A and 13B illustrate an intensity distribution for a light receiving surface when one or a plurality of slits are provided respectively. As illustrated in FIG. 13A, the light passing through a signal slit has an expansion due to the effect of diffraction at the light receiving surface. For example as illustrated in FIG. 13B, when two slits are provided, the light passing through the two slits generates interference and a light intensity distribution having a plurality of peaks is generated on the light receiving surface.

Since the optical energy is concentrated at peaks at this time, light having a higher luminance than that in using a single slit is illuminated in proximity to the peaks. With this phenomenon, when one-dimensional or two-dimensional light receiving element array such as charge-coupled device (CCD) image sensor is used, since the signal intensity detectable by a single pixel is increased, the SN ratio is improved, the measurement accuracy is improved, and the measurement time can be reduced.

The light receiving element is not limited to a two-dimensional light receiving element array. It is sufficient that just a plurality of light receiving elements may be disposed in a two-dimensional arrangement on a sensor surface.

Furthermore, although the sensor is generally provided in the measurement apparatus, the sensor may be disposed on the stage of the exposure apparatus, and the polarized light characteristics of light passing through the projection optical system may be measured. However the sensor may be provided detachably so that the sensor is disposed on the stage when performing measurements, and removed after completion of measurements.

Next, a method of manufacturing a device (semiconductor device, liquid crystal display device, etc.) as an exemplary embodiment of the present invention is described.

The semiconductor device is manufactured through a front-end process in which an integrated circuit is formed on a substrate such as a wafer, and a back-end process in which a product such as an integrated circuit chip is completed from the integrated circuit on the wafer formed in the front-end process. The front-end process includes a step of exposing the substrate coated with a photoresist to light using the above-described exposure apparatus of the present invention, and a step of developing the exposed substrate. The back-end process includes an assembly step (dicing and bonding), and a packaging step (sealing).

The liquid crystal display device is manufactured through a process in which a transparent electrode is formed. The process of forming a plurality of transparent electrodes includes a step of coating a substrate such as a glass substrate with a transparent conductive film deposited thereon with a photoresist, a step of exposing the substrate coated with the photoresist thereon to light using the above-described exposure apparatus, and a step of developing the exposed glass substrate.

The device manufacturing method of this embodiment has an advantage, as compared with a conventional device manufacturing method, in at least one of performance, quality, productivity and production cost of a device.

According to the exemplary embodiments of the present invention, since highly accurate measurement of polarization characteristics is possible, highly accurate evaluation of polarization characteristics in an optical system is possible, thereby enabling improvement in the accuracy of image formation performance of an optical system and reduction in manufacturing costs. The polarization characteristics are not limited to the polarization ratio discussed above and may be any standard related to polarization such as an intensity ratio of s-polarized light and p-polarized light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-287753 filed Nov. 10, 2008, which is hereby incorporated by reference herein in its entirety.

What is claimed is:

1. A measurement method for measuring polarization characteristics of light on an image plane where an image of a mask pattern is projected, the method comprising:

illuminating the mask with light from a light source and projecting an image of the mask pattern onto the image plane;

detecting light passing through a first slit while displacing the first slit having a width less than or equal to the wavelength of the light source on the image plane, and acquiring a first light intensity distribution with respect to the direction of displacement of the first slit;

detecting light passing through a second slit while displacing the second slit having a width less than or equal to the wavelength of the light source on the image plane, and acquiring a second light intensity distribution with respect to the direction of displacement of the second slit;

determining respectively positions where a maximum value and a minimum value of the first light intensity distribution are obtained and using the light intensities at positions corresponding to the determined positions in the second light intensity distribution to calculate an index value; and obtaining the polarization characteristics corresponding to the calculated index value by using information expressing a relationship between the index value and the polarization characteristics.

2. The measurement method according to claim 1, wherein a width of the first slit is smaller than a width of the second slit.

3. The measurement method according to claim 1, wherein when a light intensity at a position in the second light intensity distribution corresponding to a position at which the first light intensity distribution takes a maximum value is denoted as Ia, and a light intensity at a position in the second light intensity distribution corresponding to a position at which the first light intensity distribution takes a minimum value is denoted as Ib, the index value is given by $$(Ia-Ib)/(Ia+Ib).$$

4. A measurement apparatus for measuring polarization characteristics of light on an image plane where an image of a mask pattern is projected, the measurement apparatus comprising:

a displacement unit configured to displace a first slit and a second slit having a width less than or equal to the wavelength of a light source on the image plane;

a light receiving unit configured to receive light passing through the first slit and the second slit; and a calculation unit configured to calculate the polarization characteristics using information obtained from the light receiving unit, wherein when the mask is illuminated with the light from the light source and an image of the mask pattern is projected onto the image plane, the measurement apparatus acquires a first light intensity distribution with respect to a direction of displacement of the first slit by receiving light passing through the first slit by the light receiving unit while the displacement unit is displacing the first slit on the image plane, and acquires a second light intensity distribution with respect to a direction of displacement of the second slit by receiving light passing through the second slit by the light receiving unit while the displacement unit is displacing the second slit on the image plane, and wherein the calculation unit determines respectively positions where a maximum value and a minimum value of the first light intensity distribution are obtained, and calculates an index value using the light intensities in the second light intensity distribution at positions respectively corresponding to the determined positions, and acquires the polarization characteristics corresponding to the calculated index value by using information expressing a relationship between the index value and the polarization characteristics.

5. An exposure apparatus for exposing a substrate, comprising:

an illumination optical system configured to illuminate a mask using light from a light source;

a projection optical system configured to project an image of the illuminated mask pattern onto the substrate; and the measurement apparatus according to claim 4, wherein the measurement apparatus measures polarization characteristics of light on the image plane of the projection optical system.

6. The exposure apparatus according to claim 5, wherein the measurement results of the measurement apparatus are used to control the illumination optical system or the projection optical system.

7. A method for manufacturing a device, the method comprising:

exposing a substrate using an exposure apparatus;

developing the exposed substrate; and producing the device from the developed substrate, wherein the exposure apparatus includes an illumination optical system configured to illuminate a mask using light illuminated from a light source, a projection optical system configured to project an image of the illuminated mask pattern image onto the substrate, and a measurement apparatus configured to measure polarization characteristics of light on an image plane where the image of the mask pattern is projected, wherein the measuring apparatus includes a displacement unit configured to displace a first slit and a second slit each having a width less than or equal to the wavelength of the light source on the image plane, a light receiving unit configured to receive light passing through the first slit and the second slit, and a calculation unit configured to calculate polarization characteristics using information obtained from the light receiving unit, wherein when the mask is illuminated with the light from the light source and an image of the mask pattern is projected onto the image plane, the measurement apparatus acquires a first light intensity distribution with respect to a direction of displacement of the first slit by receiving light passing through the first slit by the light receiving unit while the displacement unit is displacing the first slit on the image plane, and acquires a second light intensity distribution with respect to a direction of displacement of the second slit by receiving light passing through the second slit by the light receiving unit while the displacement unit is displacing the second slit on the image plane, and wherein the calculation unit determines respectively positions where a maximum value and a minimum value of the first light intensity distribution are obtained, calculates an index value using the light intensities in the second light intensity distribution at positions respectively corresponding to the determined positions, and acquires the polarization characteristics corresponding to the calculated index value by using information expressing a relationship between the index value and the polarization characteristics.

* * * * *